(12) United States Patent
Brdiczka et al.

(10) Patent No.: US 8,880,530 B2
(45) Date of Patent: Nov. 4, 2014

(54) METHOD FOR SEARCHING RELATED DOCUMENTS BASED ON AND GUIDED BY MEANINGFUL ENTITIES

(75) Inventors: Oliver Brdiczka, Mountain View, CA (US); Petro Hizalev, Palo Alto, CA (US); Chris Holmes, Redwood City, CA (US); Andriy Mochalskyy, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 435 days.

(21) Appl. No.: 13/089,222

(22) Filed: Apr. 18, 2011

(65) Prior Publication Data

US 2012/0265767 A1    Oct. 18, 2012

(51) Int. Cl.
*G06F 7/00* (2006.01)
*G06F 17/30* (2006.01)
*G06Q 10/10* (2012.01)
*G06F 17/27* (2006.01)

(52) U.S. Cl.
CPC ........ *G06F 17/30731* (2013.01); *G06Q 10/107* (2013.01); *G06F 17/30684* (2013.01); *G06F 17/2785* (2013.01)
USPC ........................................... 707/739

(58) Field of Classification Search
USPC ........................................... 707/739
See application file for complete search history.

(56) References Cited

U.S. PATENT DOCUMENTS

| 7,120,868 | B2 |    | 10/2006 | Salesin |           |
|-----------|----|----|---------|---------|-----------|
| 7,231,388 | B2 |    | 6/2007  | Matsubayashi |      |
| 7,444,328 | B2 | *  | 10/2008 | Starbuck | ............... 1/1 |
| 7,472,131 | B2 |    | 12/2008 | Shanahan |          |
| 7,478,105 | B2 | *  | 1/2009  | Albornoz et al. | ...................... 1/1 |
| 7,533,094 | B2 |    | 5/2009  | Zhang |             |
| 8,082,278 | B2 | *  | 12/2011 | Agrawal et al. | ............... 707/802 |
| 8,713,001 | B2 | *  | 4/2014  | Roy et al. | ........................ 707/722 |
| 2004/0172415 | A1 | * | 9/2004 | Messina et al. | ............ 707/104.1 |
| 2006/0173824 | A1 | * | 8/2006 | Bensky et al. | .................... 707/3 |
| 2008/0005090 | A1 | * | 1/2008 | Khan et al. | ........................ 707/4 |
| 2009/0210391 | A1 | * | 8/2009 | Hall et al. | ......................... 707/3 |
| 2009/0319518 | A1 | * | 12/2009 | Koudas et al. | .................... 707/5 |
| 2010/0169320 | A1 | * | 7/2010 | Patnam et al. | ................. 707/737 |

* cited by examiner

*Primary Examiner* — Jeffrey A Burke
(74) *Attorney, Agent, or Firm* — Shun Yao; Park, Vaughan, Fleming & Dowler LLP

(57) ABSTRACT

One embodiment provides a system for searching related documents. During operation, the system receives a source document. The system then searches related documents based on semantic entities extracted from the source document. Next, the system receives user-adjusted search criteria and updates search results of related documents based on the user-adjusted search criteria.

20 Claims, 5 Drawing Sheets

US 8,880,530 B2

METHOD FOR SEARCHING RELATED DOCUMENTS BASED ON AND GUIDED BY MEANINGFUL ENTITIES

BACKGROUND

1. Field

This disclosure is generally related to analysis of document similarities. More specifically, this disclosure is related to identifying similar documents based on meaningful entities extracted from the documents as well as user input.

2. Related Art

Modern workers often deal with large numbers of documents; some are self-authored, some are received from colleagues via email, and some are downloaded from websites. Many documents are often related to one another since a user may modify an existing document to generate a new document. For example, a worker may generate an annual report by combining a number of previously generated monthly reports. When email users correspond back-and-forth to each other discussing a related topic, email messages often share similar words or combinations of words. For example, conversations discussing local weather may all include words like "rain," "snow," or "wind."

Therefore, some document-similarity calculation methods rely on the comparison of the occurrences of meaningful words that are defined as "entities" in order to derive similarities between messages or conversations. Other methods estimate document similarity by detecting a sequence of operations performed when the document is generated. However, such approaches do not consider possible comparison between documents based on different document-similarity calculation methods.

SUMMARY

One embodiment provides a system for searching related documents. During operation, the system receives a source document. The system then searches related documents based on semantic entities extracted from the source document. Next, the system receives user-adjusted search criteria and updates search results of related documents based on the user-adjusted search criteria.

In a variation on this embodiment, the search criteria comprises at least one of: a sensitivity of entity extraction corresponding to the number of entities extracted from the source document; a selection indication associated with an entity indicating whether the entity is included or excluded from the searching of related documents; a weight associated with an entity indicating the importance of the entity for the searching of related documents; and a search sensitivity indication corresponding to the number of related documents in the search result, wherein a higher sensitivity results in more related documents in the search result and a lower sensitivity results in fewer related documents in the search result.

In a variation on this embodiment, the system receives one or more added source documents, and updates search results of related documents based on semantic entities extracted from the source documents.

In a variation on this embodiment, the system allows a user to specify one or more semantic entities, and updates search results of related documents based on the user-specified semantic entities.

In a further variation, the user-specified semantic entities are relevant entities chosen from a group of known entities.

In a variation on this embodiment, the search criteria are saved in a configuration file.

In a variation on this embodiment, the system searches related documents by calculating similarity levels of other documents in relation to the source document.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of interactively and iteratively searching documents related to a source document based on semantic entities extracted from the documents. During operation, the system receives a source document. The system then searches related documents based on semantic entities extracted from the source document. The system allows a user to adjust search criteria and updates the search results of related documents based on the user-adjusted search criteria.

In order to search for related messages or conversations, embodiments of the present invention utilize calculation methods that compare the occurrences of meaningful words or "entities" in the documents. Entities are extracted from the source documents for similarity calculations. A flexible framework is provided for the user to interactively and iteratively adjust and refine the search criteria, including adding/removing source documents and the entities, changing number of entities extracted, and changing individual weights of entities for searching.

Figure 1:
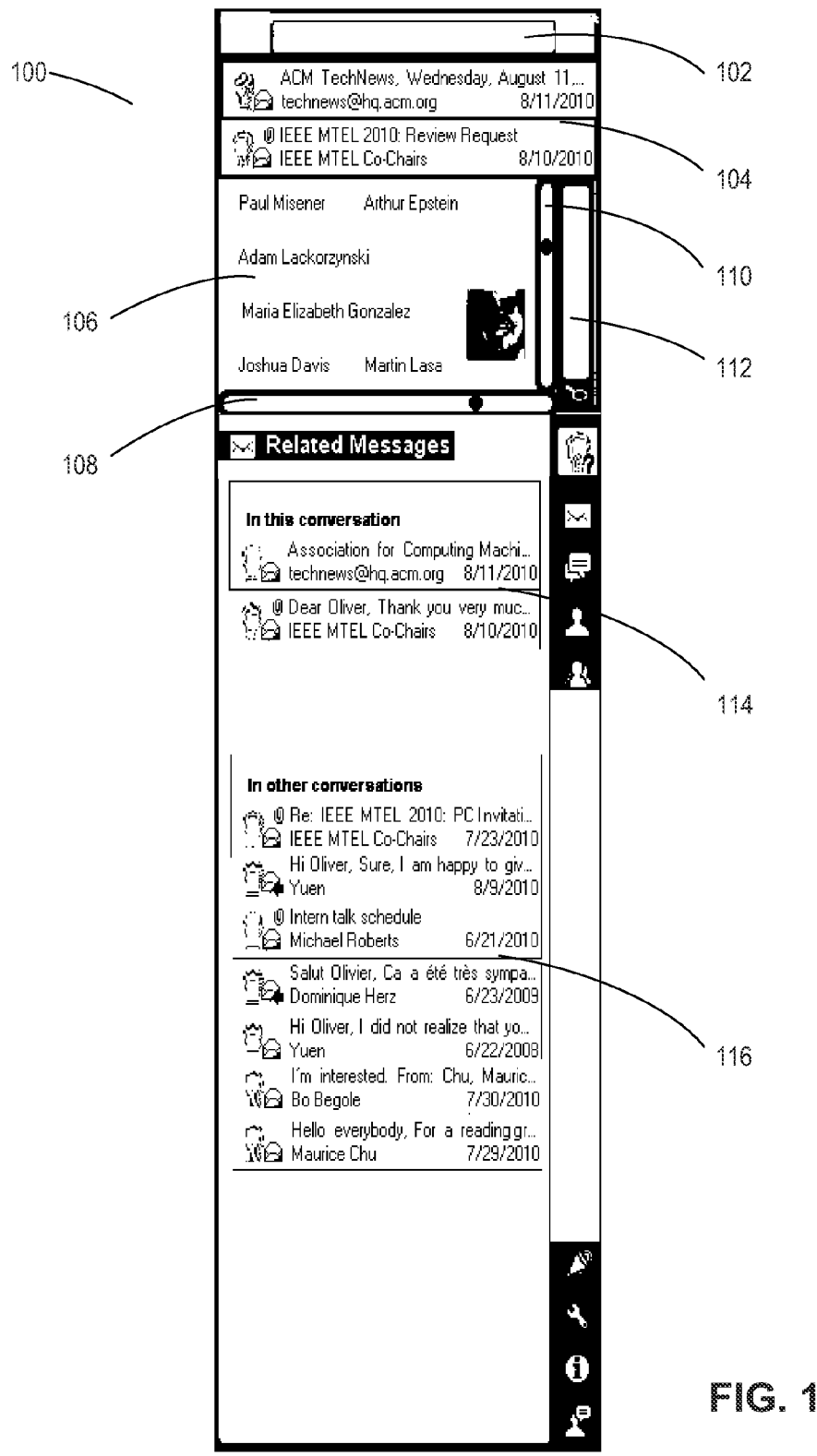
FIG. 1 presents a diagram illustrating an exemplary graphical user interface for searching related documents in accordance with an embodiment of the present invention.

FIG. 1 presents a diagram illustrating an exemplary graphical user interface for searching related documents in accordance with an embodiment of the present invention. In this example, the document type is an email message. GUI 100 includes a source-document input bar 102, a source-document list 104, an entity list 106, an entity-sensitivity slider 108, a search-sensitivity slider 110, an entity input bar 112, and related-document lists 114 and 116. To initiate a search, a user can input or drag and drop one or more documents into source-document input bar 102 on top of GUI 100. Source-document list 104 shows the current source documents (two emails) added by the user.

Semantic entities are then extracted from the source documents to form the basis for searching related documents which contain all or a large subset of these entities. Extracted entities from the source documents are visualized in entity list 106. The entities can be shown either textually (e.g., names of persons or companies) or graphically (e.g., photos of persons or company logos). Individual entities can be included or excluded from the search by highlighting the name or photo associated with the entity. The number of entities extracted from the source documents can be controlled by the user with entity-sensitivity slider 108. For example, by sliding entity-sensitivity slider 108 to the right, the user extracts more entities from the source documents. The user is also allowed to adjust the weight of individual entities for searching by resizing the entity name or photos in entity list 106.

If extra entities, in addition to those extracted from the source documents, need to be added, the user may either type the entity names or drag and drop the entities from a global database of known entities into entity input bar 112. The extra entities added by the user are shown together with the extracted entities in entity list 106, and can subsequently be included or excluded from the search. Search-sensitivity slider 110 allows the user to adjust the sensitivity of the entity-based related-documents search. A higher sensitivity results in more related documents in the search result, and a lower sensitivity results in fewer related documents in the search result. In GUI 100, search results are shown in related-document lists 114 and 116, which are separated depending on whether the related email messages belong to the same conversation as the source email messages.

Figure 2:
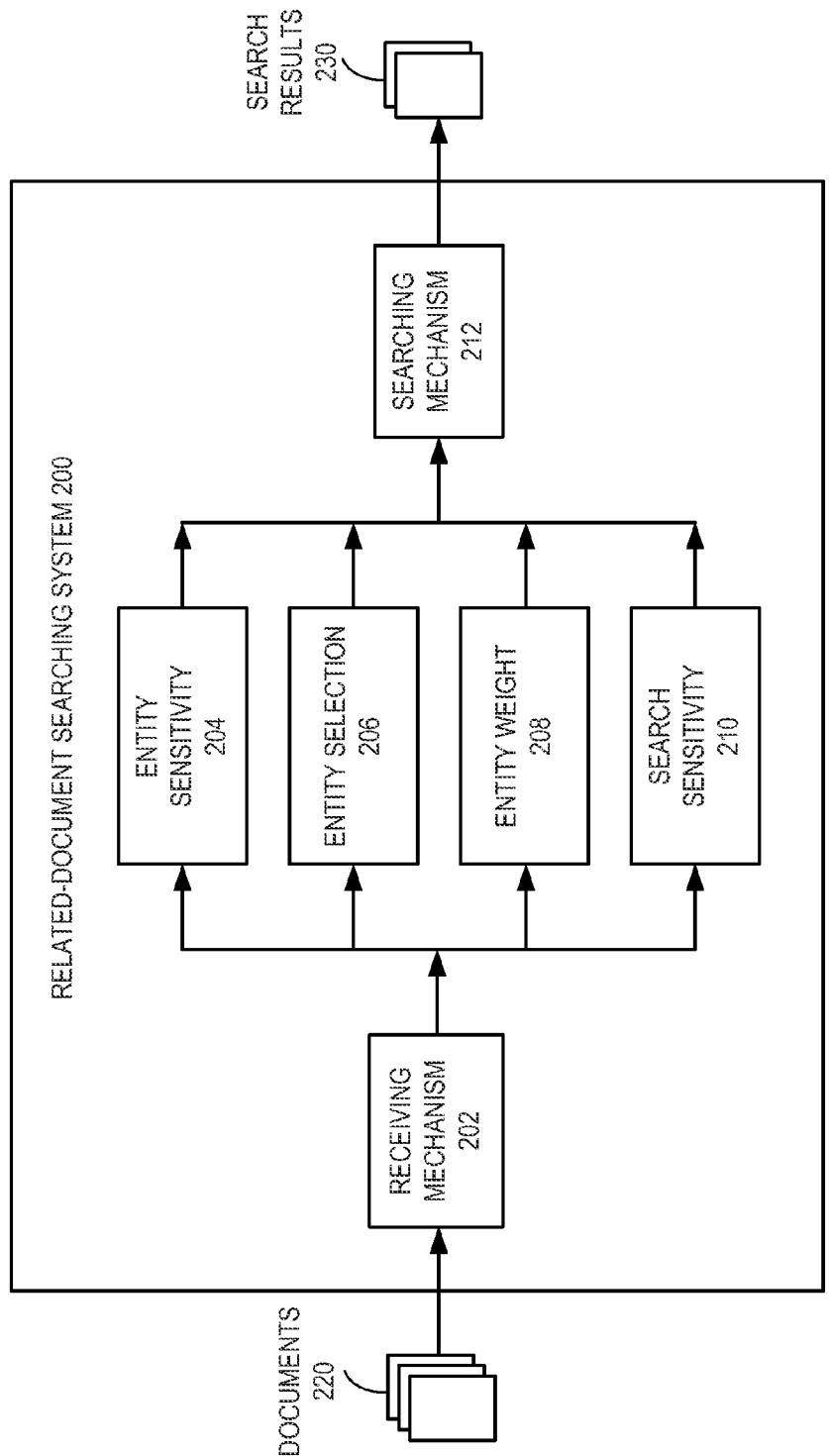
FIG. 2 presents a diagram illustrating a related-document searching system in accordance with an embodiment of the present invention.

FIG. 2 presents a diagram illustrating a related-document searching system in accordance with an embodiment of the present invention. Related-document searching system 200 includes a receiving mechanism 202, a number of user-adjustable search criteria 204-210, and a searching mechanism 212. During operation, receiving mechanism 202 receives source documents 220 for related-document searching. Source documents 220 can be any type of document that contains text, symbols, figures, and/or any combination thereof. Source documents 220 can also be any type of file format, such as plain text, Microsoft® Word, HyperText Markup Language (HTML), Portable Document Format (PDF), or email messages.

Source documents 220 are then subjected to a number of search criteria 204-210 to extract semantic entities. Semantic entities can be words, word combinations, or sequences having specific meanings. A word or a sequence of words is regarded as a semantic entity if it belongs to a specific word group, such as people's names, companies' names, dates and times, street addresses, industry-specific terms, email addresses, uniform resource locators (URLs), and phone numbers. Entity sensitivity 204 controls the number of entities extracted from the source documents. Once entities are extracted, users can determine whether an entity is included or excluded from the search by adjusting entity selection 206. In another embodiment, user-specified entities may also be added from external sources, such as a global entity database. Entity weight 208 is adjustable by the users to indicate the importance of each entity for the searching of the related documents. Users may also adjust search sensitivity 210 which corresponds to the number of related documents generated in the search result, wherein a higher sensitivity results in more related documents, and a lower sensitivity results in fewer related documents.

Based on the entities extracted from source documents 220 and search criteria 204-210, searching mechanism 212 performs the search and outputs search results 230 of related documents. To identify a related document, searching mechanism 212 calculates similarities between a target document and a source document using various criteria based on the occurrence and co-occurrence of the entities and their weights. For example, a similarity value exceeding a predetermined threshold indicates that the target document is related to the source document.

Searching Process

Figure 3:
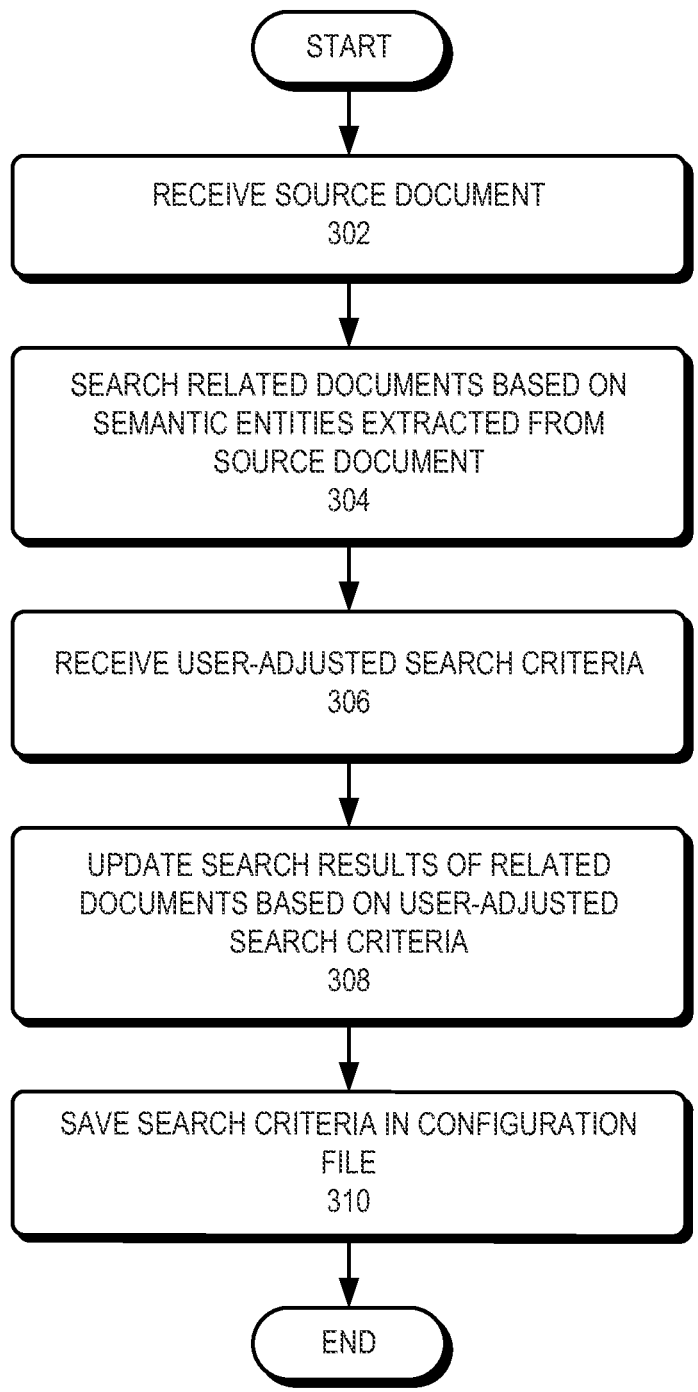
FIG. 3 presents a flowchart illustrating the process of searching related documents in accordance with an embodiment of the present invention.

FIG. 3 presents a flowchart illustrating the process of extracting entities in accordance with an embodiment of the present invention. During operation, the system receives a source document from a user (operation 302). The system then searches related documents based on semantic entities extracted from the source document (operation 304). Next, the system receives user-adjusted search criteria (operation 306). Subsequently, the system updates search results of related documents based on the user-adjusted search criteria (operation 308). The system optionally saves the search criteria in a configuration file for future use (operation 310).

The user-adjustable search criteria may include the sensitivity of entity extraction corresponding to the number of entities extracted from the source document, the selection indication associated with an entity indicating whether the entity is included or excluded from the searching of related documents, the weight associated with an entity indicating the importance of the entity for the searching of related documents, and the search sensitivity indication corresponding to the number of related documents in the search result. A higher sensitivity results in more related documents in the search result, and a lower sensitivity results in fewer related documents in the search result.

Furthermore, the related-document searching system allows users to add or remove one or more source documents. The search results of related documents are updated based on semantic entities extracted from the updated source documents. The system also allows the users to specify one or more semantic entities, and updates search results of related documents based on the user-specified semantic entities. The user-specified semantic entities are not necessarily extracted from the source documents; they could be relevant entities chosen from a global database of known entities. Each modification of the entity configuration, or source message input will trigger a new entity-based similarity query with these new modified parameters. The query results will then be shown to the user who can continuously refine them.

Figure 4:
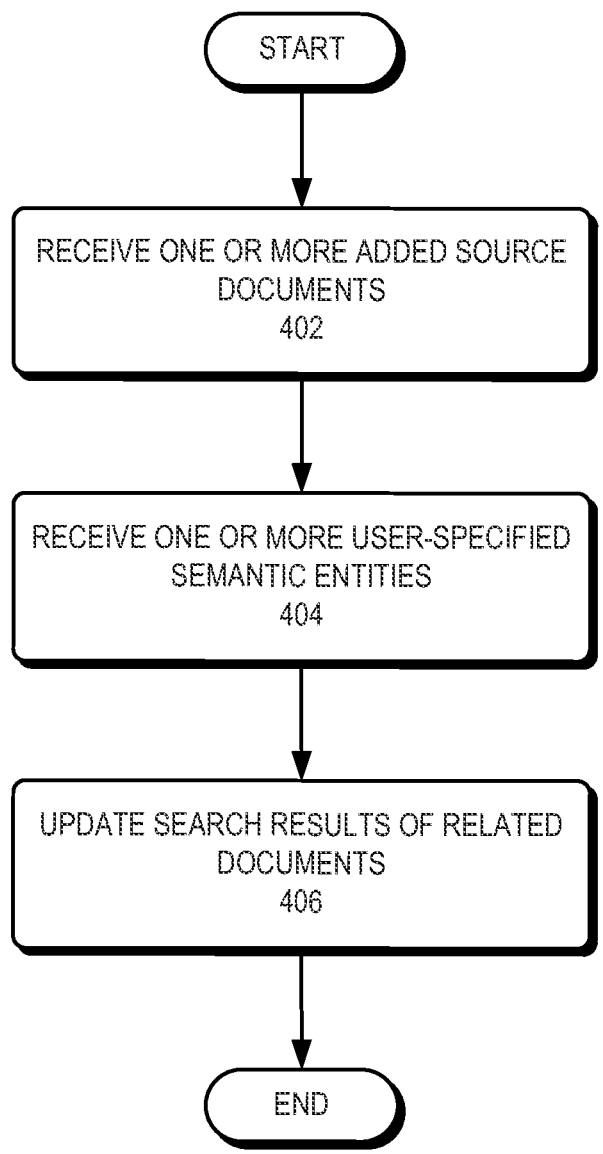
FIG. 4 presents a flowchart illustrating the process of updating search results of related documents in accordance with an embodiment of the present invention.

FIG. 4 presents a flowchart illustrating the process of updating search results of related documents in accordance with an embodiment of the present invention. During operation, the system receives one or more added source documents (operation 402). Next, the system receives one or more user-specified semantic entities (operation 404). The system then updates the search results of related documents based on the added source documents and user-specified semantic entities (operation 406).

The system may also suggest to the user entities that are most relevant to the extracted entities when the user needs to add extra semantic entities from the global database of known entities. After the user selects the entities and/or adjusts the individual weights of the entities for searching, the system can update the list of relevant entities and sort them based on their relevance to the user-specified entities. Document searches that have been fine-tuned by the user using the above method can be saved in a configuration file for later use. The saved configuration file includes a list of the source documents and entities, together with a vector of the user-customized search criteria, such as the entity extraction sensitivity, individual entity weights and the search sensitivity.

Exemplary Computer System

Figure 5:
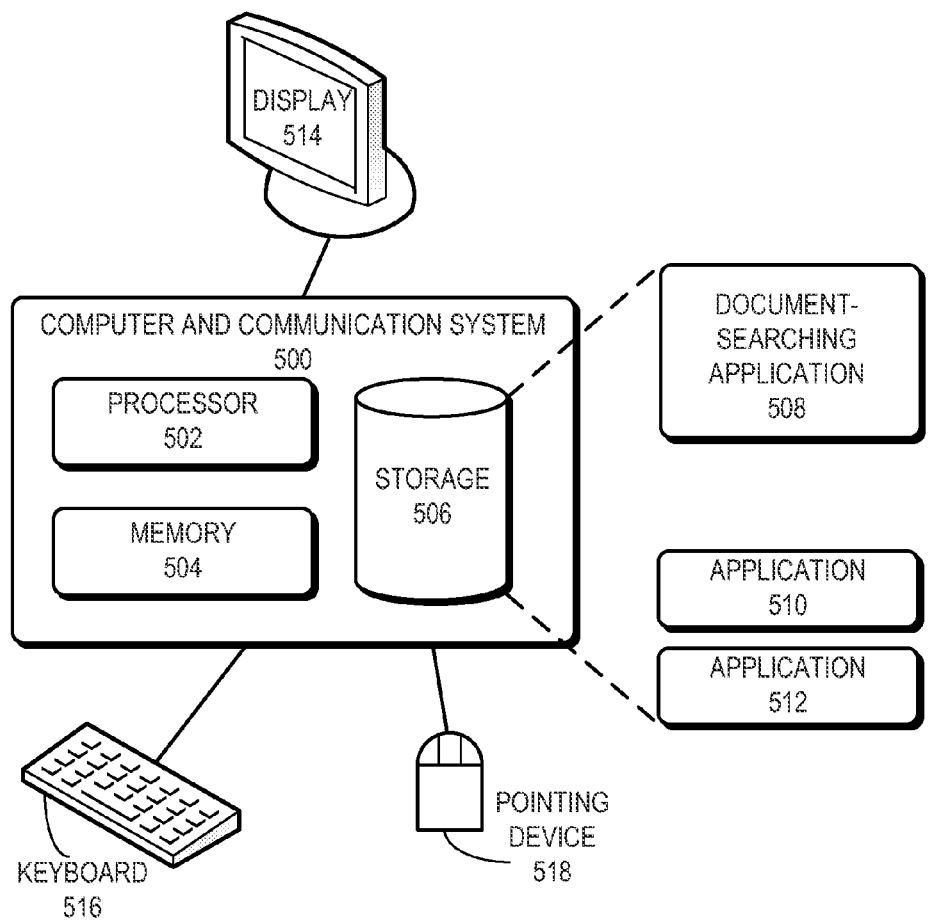
FIG. 5 illustrates an exemplary computer system for searching related documents in accordance with one embodiment of the present invention.

FIG. 5 illustrates an exemplary computer system for searching related documents in accordance with one embodiment of the present invention. In one embodiment, a computer and communication system 500 includes a processor 502, a memory 504, and a storage device 506. Storage device 506 stores a document-searching application 508, as well as other applications, such as applications 510 and 512. During operation, document-searching application 508 is loaded from storage device 506 into memory 504 and then executed by processor 502. While executing the program, processor 502 performs the aforementioned functions. Computer and communication system 500 is coupled to an optional display 514, keyboard 516, and pointing device 518.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for searching related documents, the method comprising:
   receiving a source document;
   searching for related documents based on semantic entities extracted from the source document;
   receiving user-adjusted search criteria from a user, wherein the user-adjusted search criteria include a user-adjusted entity-extraction sensitivity, and wherein the user-adjusted entity-extraction sensitivity indicates a number of semantic entities that are to be extracted from the source document; and
   updating search results of related documents based on the user-adjusted search criteria, wherein the user-adjusted search criteria include the number of semantic entities that are extracted from the source document.

2. The method of claim 1, wherein the search criteria also include at least one of:
   a selection indication associated with an entity indicating whether the entity is included or excluded from the searching of related documents;
   a weight associated with the entity, wherein the weight indicates an importance of the entity for the searching of related documents; and
   a search sensitivity indication corresponding to a number of related documents that are to be included in the search results, wherein a higher sensitivity results in more related documents being included in the search results and a lower sensitivity results in fewer related documents being included in the search results.

3. The method of claim 1, further comprising:
   receiving one or more added source documents; and
   updating the search results of related documents based on semantic entities extracted from the added source documents.

4. The method of claim 1, further comprising:
   allowing a user to specify one or more additional semantic entities; and
   updating the search results of related documents based on the user-specified semantic entities.

5. The method of claim 4, wherein the user-specified semantic entities are relevant entities chosen from a group of known entities.

6. The method of claim 1, wherein the search criteria are saved in a configuration file.

7. The method of claim 1, wherein the searching of related documents involves calculating similarity levels of other documents in relation to the source document.

8. A system for searching related documents, comprising:
   a processor;
   a memory;
   a document-receiving mechanism configured to receive a source document;
   a related-document searching mechanism configured to search for related documents based on semantic entities extracted from the source document;
   a search-criteria receiving mechanism configured to receive user-adjusted search criteria from a user, wherein the user-adjusted search criteria include a user-adjusted entity-extraction sensitivity source document, and wherein the user-adjusted entity-extraction sensitivity indicates a number of semantic entities that are to be extracted from the source document; and
   a search-updating mechanism configured to update search results of related documents based on the user-adjusted search criteria, wherein the user-adjusted search criteria include the number of semantic entities that are extracted from the source document.

9. The system of claim 8, wherein the search criteria also include at least one of:
   a selection indication associated with an entity indicating whether the entity is included or excluded from the searching of related documents;
   a weight associated with the entity, wherein the weight indicates an importance of the entity for the searching of related documents; and
   a search sensitivity indication corresponding to a number of related documents that are to be included in the search results, wherein a higher sensitivity results in more related documents being included in the search result and a lower sensitivity results in fewer related documents being included in the search results.

10. The system of claim 8, wherein the document-receiving mechanism is further configured to receive one or more added source documents; and wherein the search-updating mechanism is further configured to update the search results of related documents based on semantic entities extracted from the added source documents.

11. The system of claim 8, further comprising a user-input mechanism allowing a user to specify one or more semantic entities, wherein the search-updating mechanism is further configured to update the search results of related documents based on the user-specified semantic entities.

12. The system of claim 11, wherein the user-specified semantic entities are relevant entities chosen from a group of known entities.

13. The system of claim 8, wherein the search criteria are saved in a configuration file.

14. The system of claim 8, wherein while searching related documents, the related-document searching mechanism is further configured to calculate similarity levels of other documents in relation to the source document.

15. A graphical user interface (GUI), comprising:
a display device configured to display:
   a first user-interface element configured to receive a source document;
   a second user-interface element configured to display search results of related documents based on semantic entities extracted from the source document; and
   a third user-interface element configured to receive user-adjusted search criteria from a user, wherein the user-adjusted search criteria include a user-adjusted entity-extraction sensitivity, and wherein the entity-extraction sensitivity indicates a number of semantic entities that are to be extracted from the source document; wherein search results of related documents are updated based on the user-adjusted search criteria, wherein the user-adjusted search criteria include the number of semantic entities that are extracted from the source document.

16. The GUI of claim 15, wherein the search criteria also include at least one of:
   a selection indication associated with an entity indicating whether the entity is included or excluded from the searching of related documents;
   a weight associated with the entity, wherein the weight indicates an importance of the entity for the searching of related documents; and
   a search sensitivity indication corresponding to a number of related documents that are to be included in the search result, wherein a higher sensitivity results in more related documents being included in the search result and a lower sensitivity results in fewer related documents being included in the search results.

17. The GUI of claim 15, wherein the first user-interface element is further configured to allow a user to add one or more source documents; and wherein the search results of related documents are updated based on semantic entities extracted from the added source documents.

18. The GUI of claim 15, wherein the first user-interface element is configured to allow a user to specify one or more semantic entities; and wherein the search results of related documents are updated based on the user-specified semantic entities.

19. The GUI of claim 15, wherein the display device is further configured to display a fourth user-interface element, wherein the fourth user-interface element is configured to receive one or more semantic entities.

20. The GUI of claim 15, wherein the display device is further configured to display a fifth user-interface element which allows a user to adjust the entity-extraction sensitivity corresponding to a number of entities that are to be extracted from the source document.

* * * * *